United States Patent
Winstead

(10) Patent No.: US 6,424,842 B1
(45) Date of Patent: Jul. 23, 2002

(54) DUAL FUNCTION CONNECTOR FOR CELLULAR PHONES

(75) Inventor: Russell Winstead, Raleigh, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/111,809

(22) Filed: Jul. 7, 1998

(51) Int. Cl.[7] .................................................. H04B 1/38
(52) U.S. Cl. ........................ 455/557; 455/575; 455/550; 455/574
(58) Field of Search .......................... 455/90, 575, 572, 455/573, 574, 567, 556, 351, 349, 348, 89, 550

(56) References Cited

U.S. PATENT DOCUMENTS

| | | | | |
|---|---|---|---|---|
| 4,684,870 A | * | 8/1987 | George et al. | 455/343 |
| 4,955,071 A | * | 9/1990 | Wong et al. | 455/90 |
| 5,142,573 A | * | 8/1992 | Umezawa | 379/454 |
| 5,189,358 A | * | 2/1993 | Tomura | 455/90 |
| 5,438,685 A | * | 8/1995 | Sorensen et al. | 455/90 |
| 5,487,099 A | * | 1/1996 | Maekawa | 455/90 |
| 5,490,202 A | * | 2/1996 | Maekawa | 455/90 |
| 5,535,434 A | * | 7/1996 | Siddoway et al. | 455/575 |
| 5,809,432 A | * | 9/1998 | Yamashita | 455/557 |
| 5,832,391 A | * | 11/1998 | Komoda et al. | 455/572 |
| 6,049,725 A | * | 4/2000 | Emmert et al. | 455/573 |
| 6,285,890 B1 | * | 9/2001 | Panian | 455/557 |

* cited by examiner

Primary Examiner—Edward F. Urban
Assistant Examiner—Tilahun Gesesse
(74) Attorney, Agent, or Firm—Coats & Bennett, P.L.L.C.

(57) ABSTRACT

A dual function connector for a mobile radio communication device functions as both a system connector for connecting the phone to external devices and a battery connector for establishing contact between the battery and the phone's internal circuits. The dual function connector comprises a contact housing having a plurality of slots, two or more dual function contacts, and one or more system contacts. The dual function contacts and system contacts are received in respective slots in the contact housing. The dual function contacts and system contacts each include a system interface portion which serves as a contact for connecting external devices. The dual function contacts also include a battery interface portion for establishing an electrical connection to the battery. The dual function contacts eliminate the need to have separate connections for the battery and system contacts.

15 Claims, 6 Drawing Sheets

DUAL FUNCTION CONNECTOR FOR CELLULAR PHONES

FIELD OF THE INVENTION

The present invention relates to mobile telephones and more particularly to system connectors and battery connectors for mobile telephones.

BACKGROUND OF THE INVENTION

Cellular phones are becoming increasingly popular in the United States and elsewhere. One reason for the popularity of cellular phones is that it liberates the user from being tied down to a fixed communication network. A cellular phone transmits and receives voice and data signals over an RF channel and is typically powered by a removable battery. Typically, the phone includes a battery connector built into the back housing to establish electrical contact between the battery and the phone's circuits. When the battery is depleted, it can be removed and replaced by another charged battery. The depleted battery can then be placed in a battery charger for recharging. These features give the cellular phone a high degree of portability allowing the user to carry the phone from place to place while remaining accessible to the communication network.

In order to extend the capabilities of the mobile phone, most mobile phones include a system connector for connecting the mobile phone to external devices. One common use for a system connector is to connect a mobile phone to a vehicle mounted cradle and/or handsfree kit while the user is operating a vehicle. The system connector can also be used to connect the phone to a fax machine or computer. Some battery chargers also plug into the system connector to recharge the phone's battery without removing the battery from the phone.

Currently, all cellular phones use separate connectors for the battery and external systems. The battery connector is used to establish a contact between the removable battery and the phone's internal circuits. The system connector is used, as previously described, for connecting things like headsets, battery chargers, and car cradles. Each of these connectors requires space in the telephone and adds to the cost of the phone.

There is a trend among mobile phone companies to make phones smaller to meet consumer demands for increasingly smaller phones. In order to meet this demand, mobile phone companies must find new ways to eliminate or downsize components. One way to accomplish this is to eliminate redundant components in existing designs for mobile phones.

SUMMARY OF THE INVENTION

The present invention provides a dual function connector for use in cellular telephones. The connector functions as both a system connector for connecting the phone to external devices, and a battery connector for establishing contact between the battery and the phone's internal circuits. Thus, the present invention uses one connector to handle the functions of two connectors in prior art designs. This decreases the number of components in the phone and therefore allows the phone to be made smaller and cheaper.

The dual function connector comprises a contact housing, one or more system contacts, and a pair of dual function contacts. The system contacts and dual function contacts serve to connect external devices, such as cradles, headsets, etc., to the phone's internal circuits. The dual function contacts also serve to establish an electrical connection between the battery and the phone's internal circuits. In the preferred embodiment of the invention, surface mount technology is used to connect the system contacts and dual function contacts to the phone's internal circuits.

DETAILED DESCRIPTION OF THE INVENTION

Figure 1:
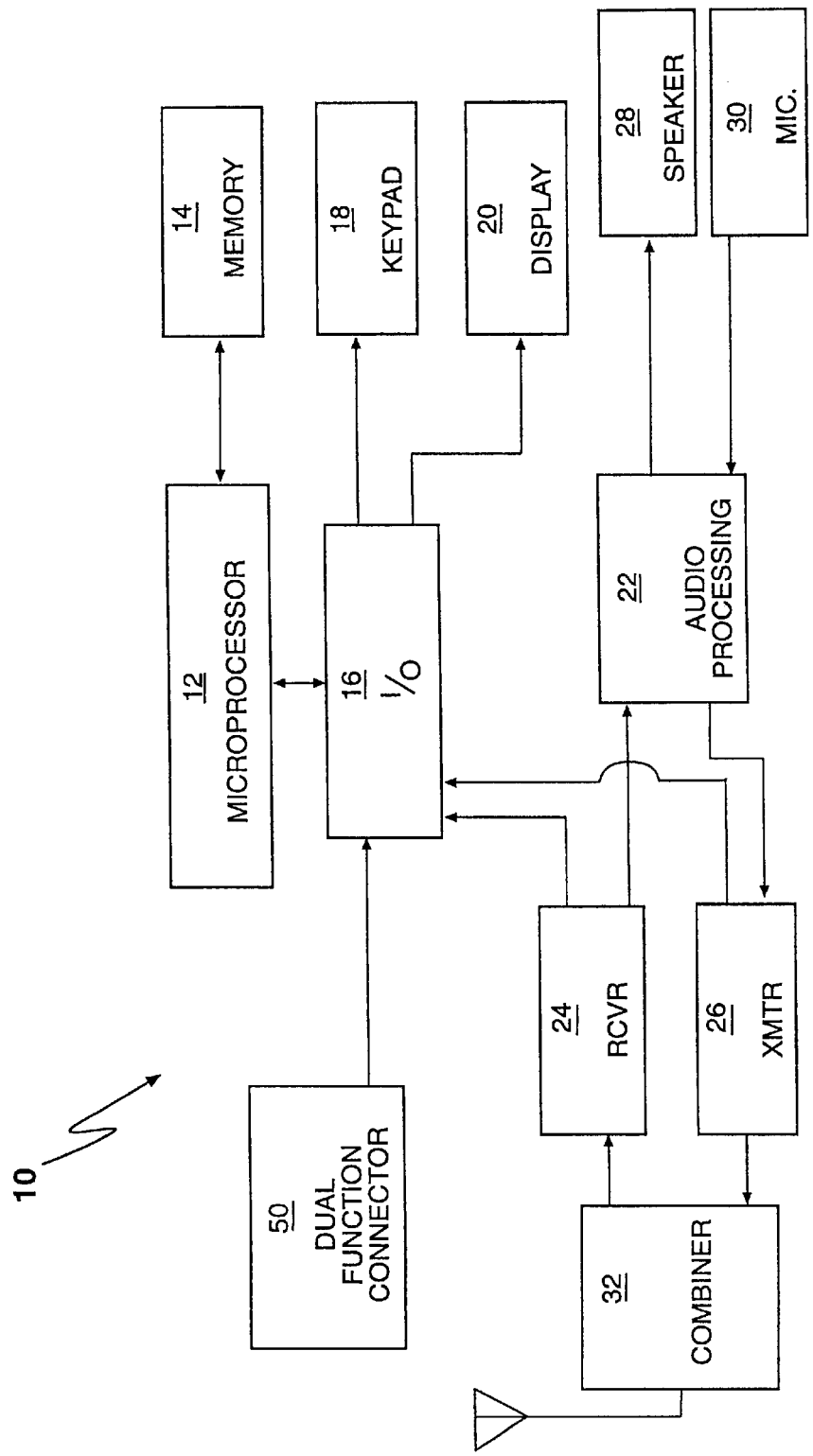
FIG. 1 is a block diagram for the general architecture of a mobile telephone.

Referring now to the drawings, a preferred embodiment of the present invention will be described. It is understood, however, that the present invention can take on many different embodiments and is not intended to be limited to the embodiments described herein.

FIG. 1 illustrates in block diagram form the general architecture of a mobile telephone, indicated generally by the numeral 10, constructed in accordance with the present invention. The mobile telephone 10 includes a microprocessor 12 for controlling the operation of the mobile telephone 10 and a program memory 14 for storing programs used by the mobile telephone 10. Input/output circuits 16 interface the microprocessor 12 with a keypad 18, a display 20, audio processing circuits 22, receiver 24, and transmitter 26. The audio processing circuits 22 provide basic analog audio outputs to the speaker 28 and accept analog audio inputs from the microphone 30. A conventional signal combiner 32 permits two-way, fully duplex communication over a common antenna 34.

Figure 2:
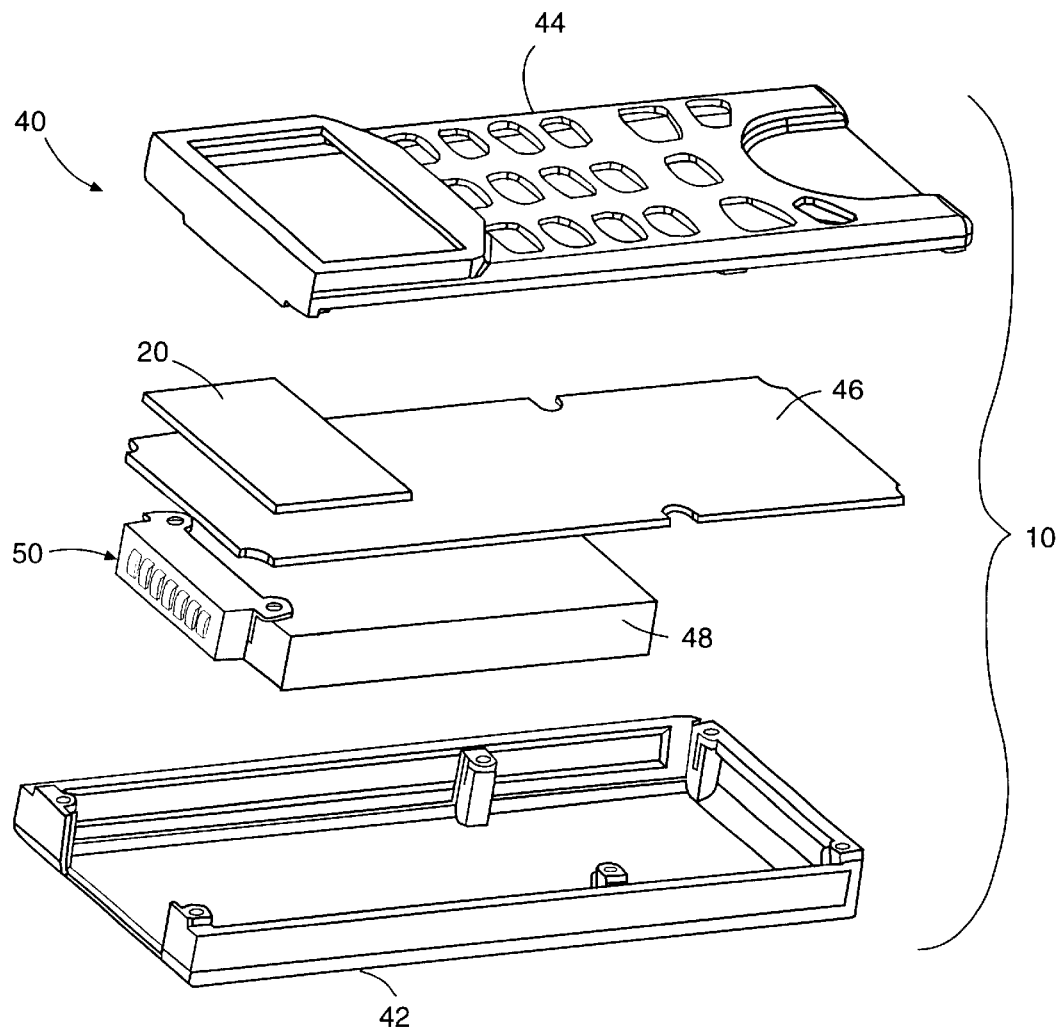
FIG. 2 is an exploded perspective view of a mobile telephone incorporating the dual function connector of the present invention.

FIG. 2 is an exploded perspective view of the mobile telephone 10. The mobile telephone 10 includes a housing 40 comprising a back cover 42 and a front cover 44. The back cover 42 includes means for removably or permanently mounting a battery 48 to the phone. The front cover 44 of the mobile telephone 10 contains the keypad 18, display 20, speaker 28, microphone 30, and antenna connections. A printed circuit board 46 is contained within the housing. The printed circuit board 46 contains the microprocessor 12, program memory 14, input/output circuits 16, audio processing circuits 22, receiver 24, transmitter 26, and signal combiner 32.

A conventional mobile telephone 10 also includes a battery connector and a system connector. In a conventional mobile telephone, the battery connector and system connector are separate. The battery connector is typically formed as part of the back cover 42. The system connector is typically mounted to the printed circuit board 46. The mobile telephone 10 of the present invention, in contrast, includes a dual function connector 50 that functions as both a battery connector and a system connector. The dual function connector 50 provides an electrical connection between the battery 48 and the printed circuit board 46. The dual function connector 50 also serves as a system connector to provide an electrical connection between the printed circuit board 46 and an external device, such as a cradle for the phone.

By combining the functions of the battery connector and the system connector, the dual function connector 56 of the present invention significantly reduces the space requirements for these components and thus facilitates reduction in the size of the mobile telephone 10.

Referring now to FIGS. 3–8, the dual function connector 50 is shown. The dual function connector 50 consists of three main parts: a contact housing 52, a plurality of system contacts 60, and a pair of dual function contacts 70. The contact housing 52 holds the two different types of contacts 60, 70. The system contacts 60 are used for connecting external devices to the telephone 10. These external devices include accessories such as headsets, battery chargers, and car cradles. The dual function contacts 70 function as both a system contact and a battery contact. The system contact function is identical to the function of the regular system contact. In addition, the dual function contacts 70 are used to establish contact between the battery 48 and the printed circuit board 46. The connector 50 is designed to look and function identically to the previous existing system connectors on the external side of the connector 50 so that the mobile phone 10 will be compatible with existing accessories without the need to redesign the accessories.

FIGS. 3–6 illustrate the contact housing 52 in greater detail. The contact housing 52 is made of plastic or other non-conductive material and has a generally rectangular configuration. The contact housing 52 can be made by injection molding. The housing 52 includes an external side or front side 52a and a back side 52b. The front side 52a is accessible to external devices, typically through an opening in the phone's housing 40. The back side 52b faces the battery 48. The housing 52 contains a plurality of slots or cells 54 for the contacts 60, 70. The connector 50 shown in the drawings, has seven total slots 54. The two outer slots 54 contain the dual function contacts 70. The five middle slots 54 contain the system contacts 60. It is understood, however, that the number of slots 54 or contacts 60, 70 is not an important aspect of the invention and that a lessor or greater number could be used. It is also understood that the specific slots 54 used for the dual function contacts 70 are selected based on compatibility with existing accessories and batteries.

The contact housing 52 has two protruding tabs 56. Each tab 56 includes an opening 58 to allow the passage of screws that secure the front and back cover, 42 and 44, together. The tabs 56 help hold the contact housing 52 in its proper location when the phone is assembled. The tabs 56 are not, however, an essential element of the invention and could easily be eliminated. While the contact housing 52 is described herein as being separate from the housing 40, it is also possible to have a connector 50 that is an integral part of the front or back cover of the telephone 10.

The primary function of the contact housing 52 is to provide a housing for the system contacts and dual function contacts. In addition, the contact housing 52 functions as a mechanical bulkhead to physically constrain the battery. When the phone 10 is assembled, the contact housing 52 is captured between the front cover and back cover of the phone's housing 40. The tabs 56 and soldered connection also help hold the contact housing 52 in its proper location.

Figure 3:
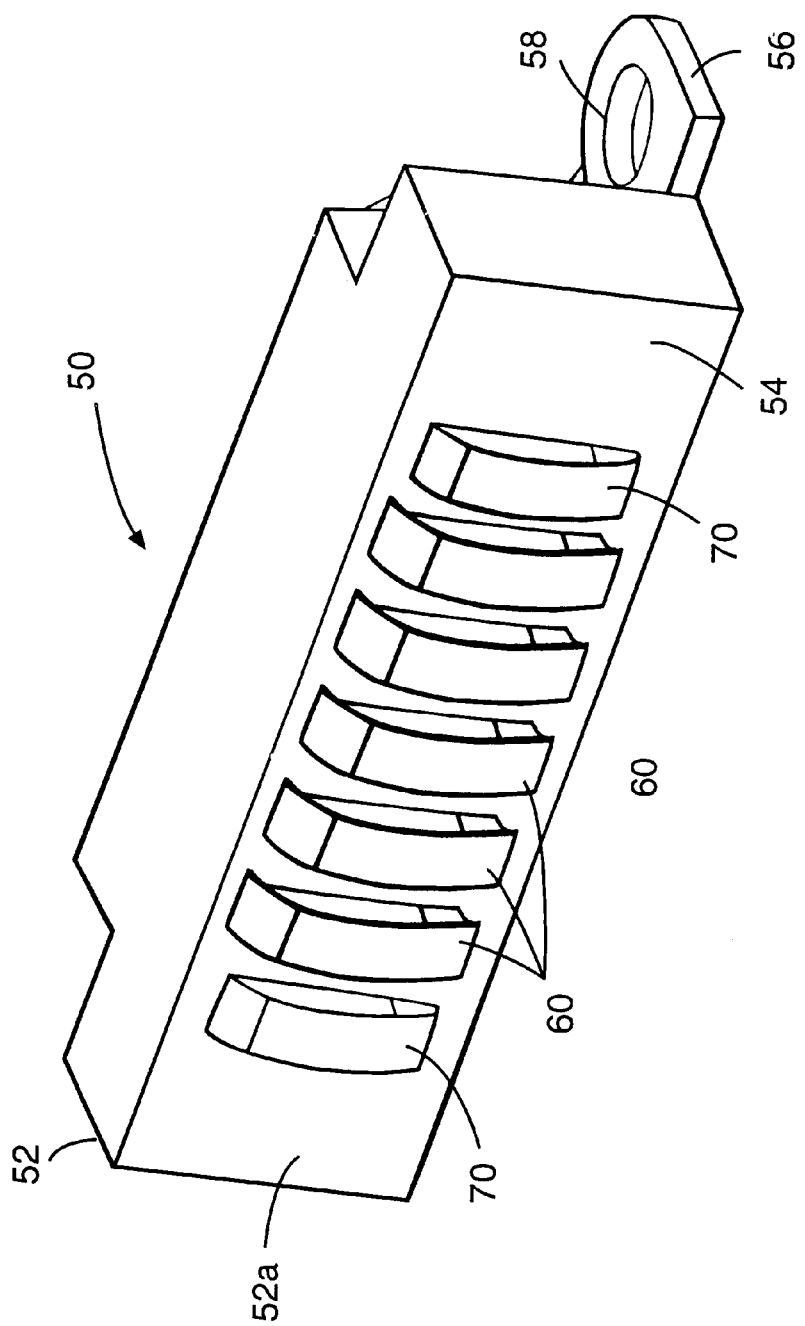
FIG. 3 is a perspective view of the dual function connector as seen from the system side of the connector.
Figure 5:
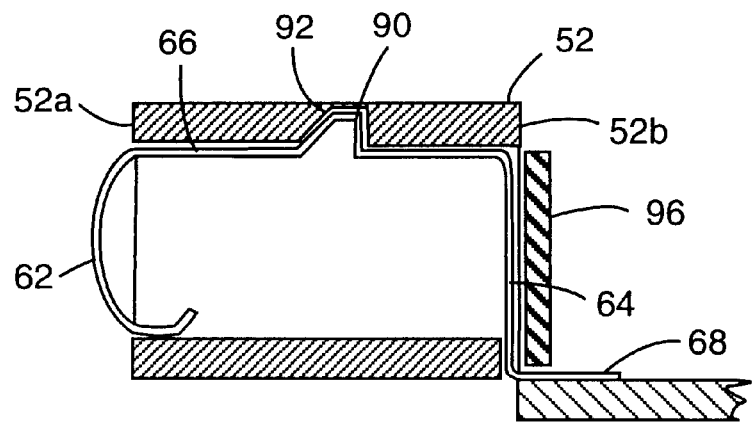
FIG. 5 is a cross-section of the dual function connector showing a system contact.
Figure 7:
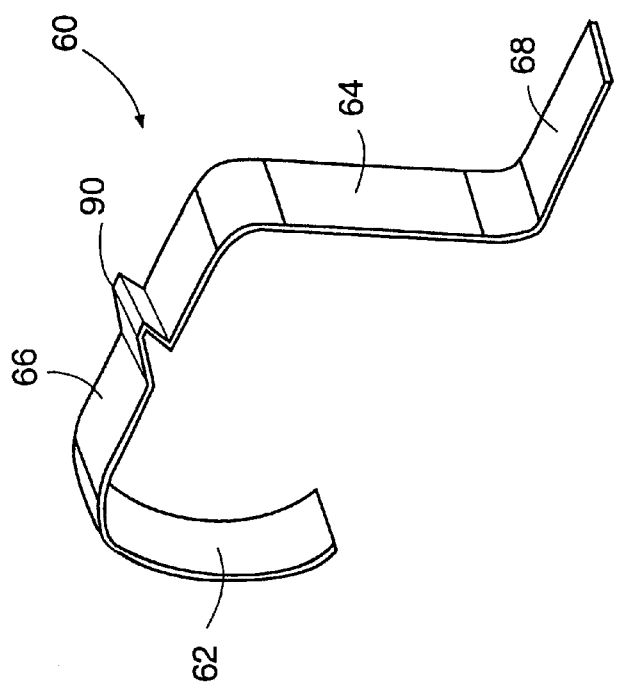
FIG. 7 is a perspective view of a system contact used in the dual function connector.

Referring now to FIG. 7, the structure of a system contact 60 is shown. The system contact 60 is made from a thin strip of stamped and formed conductive material such as a copper beryllium. Alternatively, the contact 60 could be stamped from a thin sheet material. The system contact 60 is designed to avoid contact with the battery electrodes. The system contact 60 includes a system interface segment 62, a vertical segment 64, a bridge segment 66 and a lead 68. The system interface segment 62 is curved and protrudes from the front side 52a of the contact housing 52 as can be seen in FIGS. 3 and 5. The end of the system interface segment 62 curves upward slightly to prevent it from snagging when the contact 60 is inserted into the contact housing 52. The system interface segment 62 is connected to the SMT lead 68 by bridge segment 66 and vertical segment 64. The vertical segment 64 and bridge segment 66 are sometimes referred to herein as the intermediate portion. The vertical segment 64 is disposed adjacent to the back side 52b of the contact housing 52 and is recessed slightly to prevent contact with the battery 48 as can be seen in FIG. 5. Note that the bottom wall of the housing 52 terminates just short of the back side of the connector housing 52 to allow recession of the vertical segment 64. The lead 68 extends rearwardly from the contact housing 52. The purpose of the lead 68 is to make an electrical connection with the phone's printed circuit board 46. This connection can be made by forming lead 68 to become a surface mounted lead (as shown) or a pin-in-hole lead.

Figure 4:
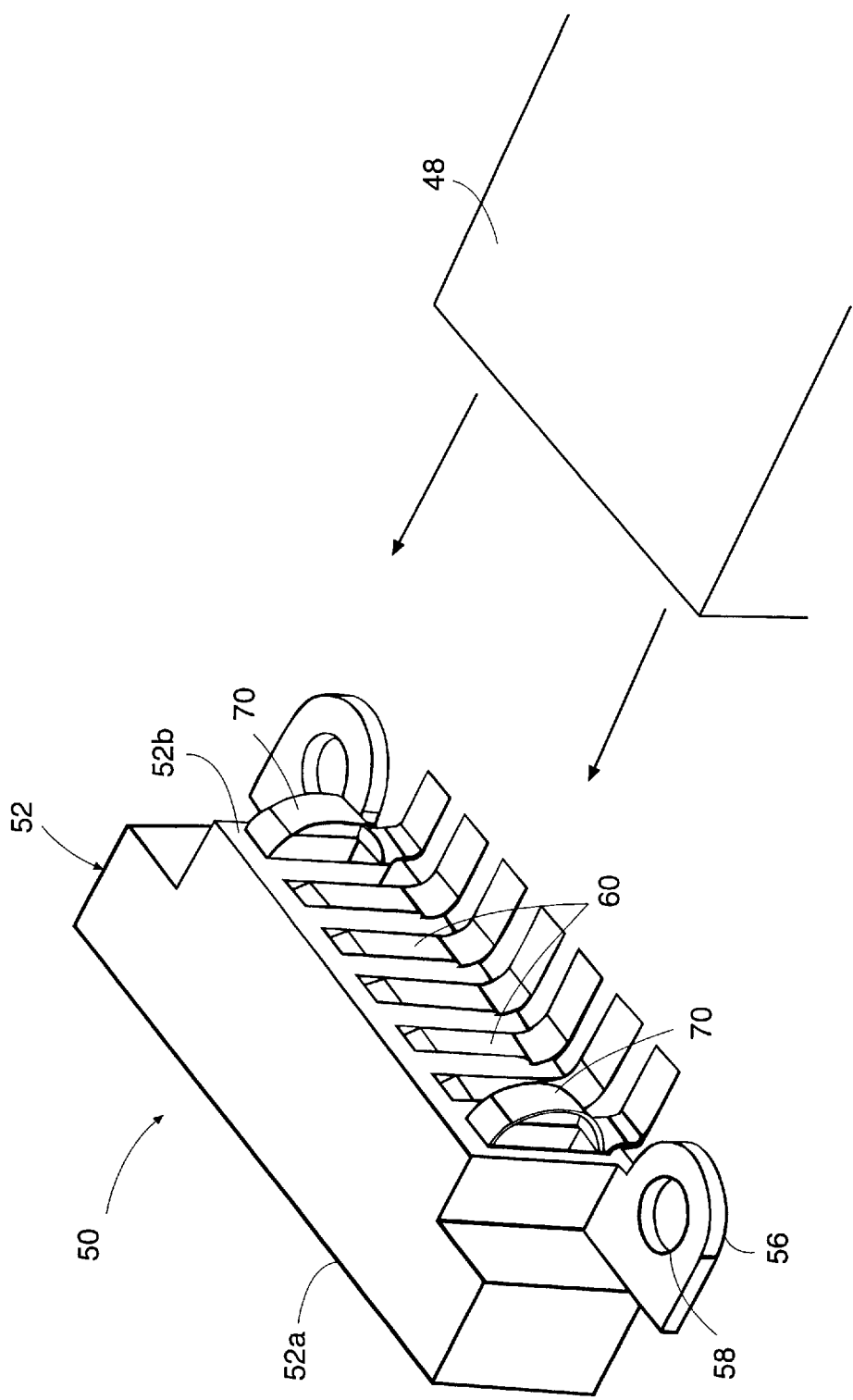
FIG. 4 is a perspective view of the dual function connector as seen from the battery side of the connector.
Figure 6:
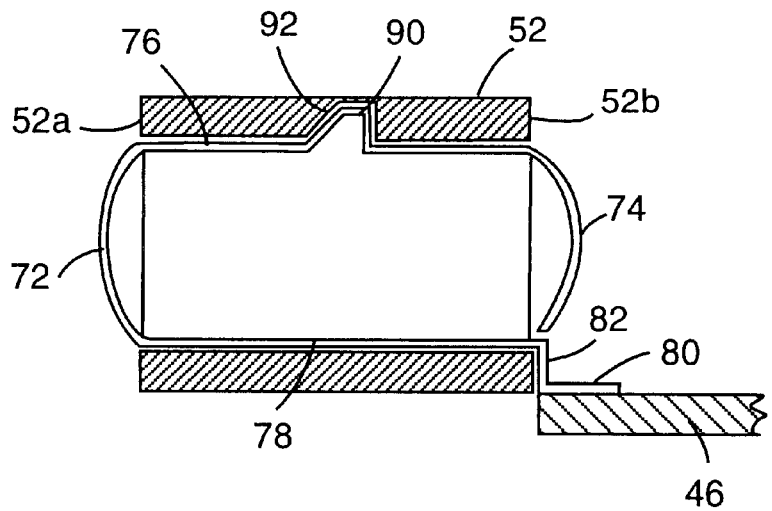
FIG. 6 is a cross-section of the dual function connector showing a dual function contact.
Figure 8:
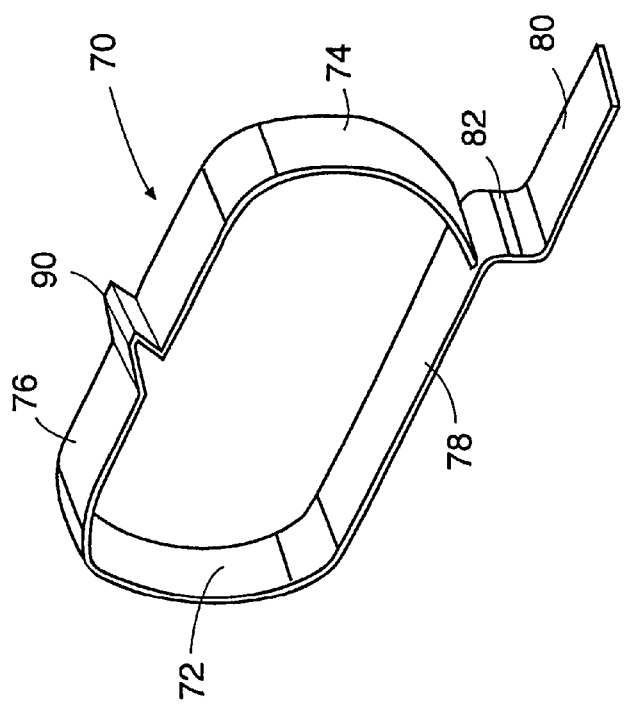
FIG. 8 is a perspective view of a dual function contact used in the dual function connector.

FIG. 8 shows a dual function contact 70 which is fashioned in a manner similar to the system contact 60. The dual function contact 70 is shaped generally like an oval that is flat on the top and the bottom. The dual function contact 70 includes a system interface segment 72, a battery interface segment 74, a bridge segment 76, a bottom segment 78, and a solder lead 80. The system interface segment 72 and battery interface segment 74 are curved in the same manner as the system interface segment 62 of the system contact 60 and protrude respectively from the front side 52a and back side 52b of the contact housing 52 as can be seen in FIGS. 3, 4 and 6. The system interface segment 72 and battery interface segment 74 are connected by the bridge segment 76. The lead 80 on the dual function contact 70 extends rearwardly from the contact housing 52 and includes a step or offset 84 to accommodate the bottom wall of contact housing 52 as seen in FIG. 6. The lead 80 is connected to the system interface segment 72 by the bottom segment 78. The bridge segment 76 and bottom segment 78 are also referred to herein as intermediate portions.

Both the system contacts 60 and dual function contacts 70 include a retention element 90 to retain the contact 60, 70 in the contact housing 52. In the disclosed embodiment, the retention element 90 is formed in the bridge segments 66, 76 of the contacts 60, 70. The retention element 90 engages with a recess 92 formed in the molded plastic contact housing 52. The contacts 60, 70 are pressed into corresponding slots 54 in the contact housing 52 until the retention elements 90 on the contact 60, 70 engage with the recess 92 in the contact housing 52. The contacts 60, 70 are made of a flexible yet resilient material which allows the contacts 60, 70 to deform slightly as it is being inserted into the contact housing 52. When the retention element 90 reaches the recess 92 in the contact housing 52, the natural resiliency of the material causes the retention element 90 to "snap" into place preventing the contacts 60, 70 from being removed unintentionally.

As previously described, each of the contacts 60, 70 has a lead 68, 80 that protrudes from the contact housing 52. This lead 68, 80 is used to physically and electrically connect the dual function connector 70 to the printed circuit board 46. Each lead 68, 80 is soldered to the printed circuit board 46 using surface mount technology. Alternatively, the connection could be a pin-thru-hole (PTH) connection, though surface mounting is preferred.

When the phone 10 is assembled, the system contact 60 and dual function contact 70 are accessible to external devices. Typically, an external device is connected via a plug having contacts that engage the contacts 60, 70 on the phone 10. The dual function contacts 70 also makes electrical contact with the battery electrodes when the battery 48 is attached to the mobile phone 10. Care should be taken to ensure that the battery electrodes 48 make contact with the dual function contact 70. This can be done by any known mechanical means to cause appropriate force against the dual function contacts 70. Care must also be taken to ensure that the battery electrodes 48 cannot make contact with the system contact 60. This can be accomplished by any known mechanical means or by providing electrical insulation 96 shown in FIG. 5. The insulation 96 should be located to insulate only the system contacts 60.

By serving as both a system connector and battery connector, the dual function connector 50 of the present invention reduces the component count and space requirements needed for system and battery connections. This not only reduces the cost of the phone, but facilitates the reduction in the size of the telephone. Alternatively, the space saved by using the dual function connector 50 of the present invention could be used to accommodate features for which space would not otherwise be available. The connector 50 also serves as a physical restraint for locating and confining the battery in its proper location.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:
1. A mobile radio communication device comprising:
 a) a housing;
 b) communication circuits contained within the housing for transmitting and receiving speech and/or data signals via a wireless carrier;
 c) a battery associated with said housing for powering the communication circuits; and
 d) a dual function connector for directly connecting the communication circuits to said battery and to an external device, said dual function connector comprising at least one system contact shaped in a first configuration for establishing an electrical connection between an external device and the communication circuits, and at least one dual function contact shaped In a second configuration for establishing an electrical connection between the communications circuits, battery, and an external device;
 e) the system contact comprises a system interface portion that projects from a first side of the dual function connector to provide a means for connecting an external device to the communication circuits; a lead to connect the system contact to the communication circuits; and one or more intermediate portions connecting the lead with the system interface portion.

2. The mobile radio communication device of claim 1 wherein the dual function contact comprises a system interface portion that projects from a first side of the dual function connector to provide a means for connecting an external device to the communication circuits; a battery interface portion projecting from a second side of the dual function connector to connect the dual function contact with a battery attached to the phone; a lead to connect the dual function contact to the communication circuits; one or more first intermediate portions connecting the lead to said system interface portion, and one or more second intermediate portions connecting said system interface portion to said battery interface portion.

3. The mobile radio communication device of claim 1 wherein the dual function contact includes a contact housing comprising a plurality of slots, wherein system contact and dual function contact are disposed in respective slots in the contact housing.

4. The mobile radio communication device of claim 3 further including retention means for retaining said contacts in their respective slots.

5. The mobile radio communication device of claim 3 wherein the system contact comprises a system interface portion that projects from a first side of the dual function connector to provide a means for connecting an external device to the communication circuits; a lead to connect the system contact to the communication circuits, and one or more intermediate portions connecting the lead with the system interface portion.

6. The mobile radio communication device of claim 3 wherein the dual function contact comprises a system interface portion that projects from a first side of the dual function connector to provide a means for connecting an external device to the communication circuits; a battery interface portion projecting from a second side of the dual function connector to connect the dual function contact with a battery attached to the phone; a lead to connect the dual function contact to the communication circuits; one or more first intermediate portions connecting the lead to said system interface portion; and one or more second intermediate portions connecting said system interface portion to said battery interface portion.

7. A dual function electrical connector for a mobile radio communication device powered by a battery and having internal communication circuits, said dual function connector comprising;
 a) a contact housing having a system side and a battery side;
 b) at least one system contact disposed in said housing for establishing an electrical connection between said communication circuits and an external device, said at least one system contact shaped in a first configuration; and
 c) at least one dual function contact disposed in said housing for establishing an electrical connection between said communication circuits, said battery, and said external device, said at least one dual function contact shaped in a second configuration different than said first configuration;
 d) said dual function contact comprises a system interface portion that projects from the system side of the contact housing to provide a means for connecting an external device to said communication circuits; a battery interface portion projecting from the battery side of the contact housing to connect the dual function contact with said battery; a lead projecting from the contact housing to connect the dual function contact to said communication circuits; a first intermediate portion connecting the lead to said system interface portion; and a second intermediate portion connecting said system interface portion to said battery interface portion.

8. The dual function connector of claim 7 wherein said system contact comprises a system interface portion that projects from th[0085] system side of the contact housing to provide a means for connecting an external device to the communication circuits; a lead projecting from the contact housing to connect the system contact to said communication circuit; and one or more intermediate portions connecting the lead with the system interface portion.

9. The dual function connector of claim 7 wherein said contact housing includes a plurality of slots, and wherein said system contacts and dual function contacts are received in respective slots in said contact housing.

10. The mobile radio communication device of claim 9 further including retention means for retaining said contacts in their respective slots.

11. The dual function connector of claim 9 wherein said system contact comprises a system interface portion that projects from the system side of the contact housing to provide a means for connecting an external device to the communication circuits; a lead projecting from the contact housing to connect the system contact to said communication circuit; and one or more intermediate portions connecting the lead with the system interface portion.

12. The dual function connector of claim 9 wherein said dual function contact comprises a system interface portion that projects from the system side of the contact housing to provide a means for connecting an external device to said communication circuits; a battery interface portion projecting from the battery side of the contact housing to connect the dual function contact with said battery; a lead projecting from the contact housing to connect the dual function contact to said communication circuits; a first intermediate portion connecting the lead to said system interface portion; and a second intermediate portion connecting said system interface portion to said battery interface portion.

13. A dual function connector for a mobile radio communication device powered by a battery and having internal communication circuits, said dual function connector comprising:

a) a contact housing having a system side and a battery side;
b) a plurality of system contacts disposed in said housing for establishing an electrical connection between said communication circuits and an external device, said system contacts including:
  i) a system interface portion that projects from the system side of the contact housing to provide a means for electrically connecting said external device to said communication circuits;
  ii) a lead projecting from the contact housing to electrically connect the system contact to said communication circuits; and
  iii) one or more intermediate portions electrically connecting the lead with the system interface portion;
c) a pair of dual function contacts disposed in said housing for establishing an electrical connection between said communication circuits, battery, and said external device, said dual function contacts having a different physical configuration than said system contacts, said dual function contact including:
  i) a system interface portion that projects from the system side of the contact housing to provide a means for electrically connecting an external device to said communication circuits;
  ii) a battery interface portion projecting from the battery side of the contact housing to electrically connect the dual function contact to said battery;
  iii) a lead projecting from the contact housing to electrically connect the dual function contact to said communication circuits;
  iv) a first intermediate portion electrically connecting the lead to said system interface portion; and
  v) a second intermediate portion electrically connecting said system interface portion to said battery interface portion.

14. The dual function connector of claim 13 wherein said contact housing includes a plurality of slots, and wherein said system contacts and dual function contacts are received in respective slots in said contact housing.

15. The mobile radio communication device of claim 13 further including retention means for retaining said contacts in their respective slots.

* * * * *